(12) United States Patent
Nagahashi

(10) Patent No.: US 7,486,807 B2
(45) Date of Patent: Feb. 3, 2009

(54) IMAGE RETRIEVING DEVICE, METHOD FOR ADDING KEYWORDS IN IMAGE RETRIEVING DEVICE, AND COMPUTER PROGRAM THEREFOR

(75) Inventor: Toshinori Nagahashi, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 676 days.

(21) Appl. No.: 10/762,450

(22) Filed: Jan. 23, 2004

(65) Prior Publication Data

US 2004/0213553 A1 Oct. 28, 2004

(30) Foreign Application Priority Data

Jan. 29, 2003 (JP) ............................. 2003-020805

(51) Int. Cl.
*G06K 9/00* (2006.01)

(52) U.S. Cl. ...................... 382/118; 382/305; 382/232; 382/243; 382/276; 382/224; 382/120; 382/128; 382/115; 382/307; 707/104.1; 707/1; 707/3; 707/100; 704/2; 704/3; 704/4; 704/277; 704/251; 704/255; 704/257; 235/487; 358/448; 358/450; 358/403; 358/453; 358/527

(58) Field of Classification Search ................. 382/305, 382/118, 209; 348/231.2; 386/69; 707/1, 707/102, 3, 104, 5, 512; 355/27; 434/217; 704/2, 3, 4, 5, 6, 7, 8, 9, 10, 277, 251, 252, 704/255, 257; 358/403, 404
See application file for complete search history.

(56) References Cited

U.S. PATENT DOCUMENTS

| 5,608,387 | A | * | 3/1997 | Davies ........................ 340/5.27 |
| 6,408,301 | B1 | * | 6/2002 | Patton et al. ................. 707/102 |
| 6,785,429 | B1 | * | 8/2004 | Senoh .......................... 382/305 |
| 6,826,316 | B2 | * | 11/2004 | Luo et al. .................... 382/305 |

(Continued)

FOREIGN PATENT DOCUMENTS

CN 1245317 A 2/2000

(Continued)

OTHER PUBLICATIONS

"Keyword and Face Image Retrieval Based on Latent Semantic Indexing", Koshimizu et al., IEEE 2004.*

(Continued)

*Primary Examiner*—Samir A Ahmed
*Assistant Examiner*—Nancy Bitar
(74) *Attorney, Agent, or Firm*—Oliff & Berridge, PLC

(57) ABSTRACT

An image retrieving device for classifying and retrieving an image by detecting an object in the image and adding a keyword comprises an image storing section for storing the image which is supposed to be classified and retrieved together with the keyword in a database, an object acknowledging section for acknowledging a predetermined object in the image which is inputted, a keyword proposing section for proposing the keyword which relates to the object which is acknowledged by the object acknowledging section, and an object information inputting section for confirming, adding, and correcting the keyword which is proposed by the keyword proposing section. By doing this, the object in the image is detected for classifying the image; thus, it is possible to provide an image retrieving device in which the keywords are added to the image efficiently.

14 Claims, 8 Drawing Sheets

U.S. PATENT DOCUMENTS

| | | | | |
|---|---|---|---|---|
| 2001/0043727 | A1* | 11/2001 | Cooper | 382/118 |
| 2002/0111939 | A1* | 8/2002 | Kondo et al. | 707/1 |
| 2005/0105803 | A1* | 5/2005 | Ray | 382/209 |
| 2005/0243188 | A1* | 11/2005 | Anderson | 348/231.2 |

FOREIGN PATENT DOCUMENTS

| | | |
|---|---|---|
| JP | A 06-215089 | 8/1994 |
| JP | A 8-221547 | 8/1996 |
| JP | A 08-249349 | 9/1996 |
| JP | A 10-049542 | 2/1998 |
| JP | A 10-307849 | 11/1998 |
| JP | A-10-312387 | 11/1998 |
| JP | A 10-326278 | 12/1998 |
| JP | A 2001-160057 | 6/2001 |

OTHER PUBLICATIONS

Wang et al.; "A Fast Human Face Detection Method From Color Images Under Complex Background"; ACTA Electronica SINICA; vol. 30 No. 10 Oct. 2002; 1995-2005 Tsinghua Tongfang Optical Disc Co., Ltd.; pp. 1566-1569 with abstract.

* cited by examiner

FIG.6

| SUPERIOR KEYWORD 1 | SUBORDINATE KEYWORD 2 | NAME | BIRTHDAY | IMAGE |
|---|---|---|---|---|
| FAMILY | SECND ELDEST BROTHER | JIRO | JANUARY 1, 2003 | IMAGE 1:TAKEN ON JANUARY 1, 2003<br>IMAGE 2:TAKEN ON FEBRUARY 1, 2003<br>IMAGE 3:TAKEN ON MARCH 1, 2003 |

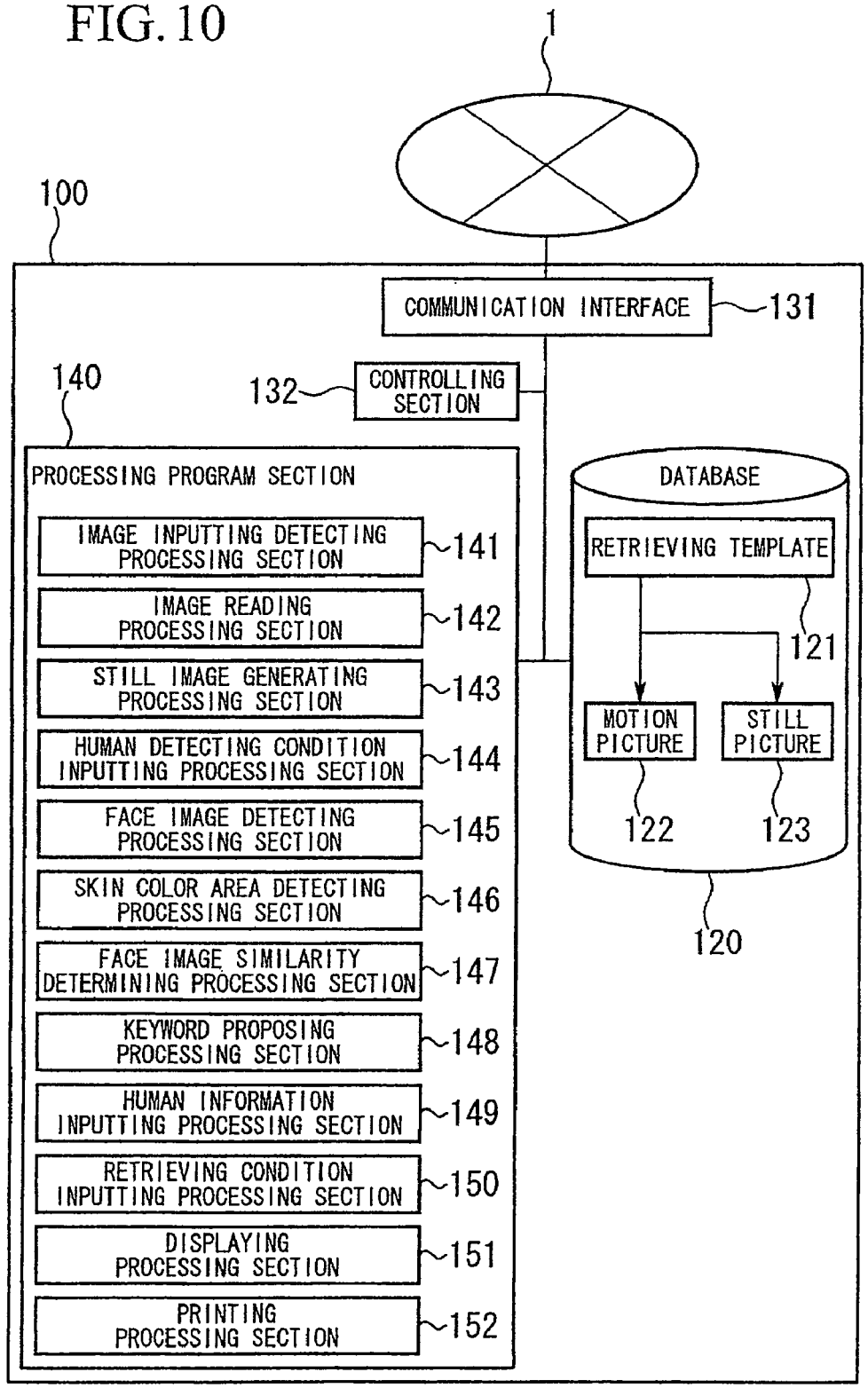

IMAGE RETRIEVING DEVICE, METHOD FOR ADDING KEYWORDS IN IMAGE RETRIEVING DEVICE, AND COMPUTER PROGRAM THEREFOR

Priority is claimed on Japanese Patent Application No. 2003-20805 filed Jan. 29, 2003, the content of which is incorporated herein by reference.

BACKGROUND OF THE INVENTION

1. Field of the Invention

The present invention relates to an image retrieving device for classifying and retrieving a digital image, a method for adding keywords in the image retrieving device, and a computer program therefor. In particular, the present invention relates to an image retrieving device for classifying and retrieving a digital image, a method for adding keywords in the image retrieving device, and a computer program therefor such that it is possible to add keywords to the image efficiently by detecting an object (for example, a human) in the image during retrieving and classifying the image.

2. Description of Relate Art

Recently, digital cameras are prevailing so popular that it is often that digital images which is formed by taking pictures (hereinafter, called an image for short) is stored in a PC (personal computer) and displayed on a display of the PCs later so as to view for pleasure. Also, it is often that the stored images are clipped out so as to be edit on a display of the PCs and collect them as a photo album electronically.

In such a case, it is necessary to clip out necessary images among numerous images by retrieving the digital images which are stored in the PCs. For an efficient retrieval for the digital images, it is necessary to add anything like keywords to the images which is stored (registered) for a retrieving purpose.

For general cases, an ordinary user of a digital camera takes pictures of humans such as her, or his family. In such a case, it is useful to store the images while adding keywords for specifying the human (object) whose picture is taken.

However, it needs experience and skill as a background for expertise in adding and classifying keywords and retrieving the images efficiently; thus, such categorization and retrieval have been difficult and disturbing for ordinary users.

For such storage and retrieval for the images, several prior arts have been disclosed as follows so as to deal with the above problems.

(1) External information (such as place, date, and contents which are pictured) are added to the images in advance which are supposed to be retrieved; thus, the external information is used for the retrieval.

(2) Also, a product has been released marketwise by which a quantitative characteristics in the image are (such as color and shape) utilized such that the user may retrieve the image efficiently by disposing the object image above a three-dimensional space according to the quantitative characteristics of the image.

(3) Also, there is a prior art for "Method for hierarchically classifying image and device for classifying and retrieving picture and recording medium with program for executing the method recorded thereon" which is disclosed in Japanese Unexamined Patent Application, First Publication No. 2001-160057.

The invention which is disclosed in Japanese Unexamined Patent Application, First Publication No. 2001-160057 relates to a technique in which images are classified and retrieved interactively and hierarchically while using an image dictionary which is produced in advance. In this invention, a system proposes major classifying points such as an area color, a line, an object, and an image dictionary for a group of image to the user during the navigation. When the user selects the image dictionary, the system proposes classifying points such as a "face of a human", "sky", and "roof". When the user selects the "face of human", the system proposes a group of image for picture of human. Similarly, minor classifying points such as the area color, a liner line, an object and an image dictionary are proposed to the user for a group of the image; thus, a classifying operation is performed by selecting the classifying points. Such a navigation history is useful for classifying the image DB; therefore, the navigation history is saved in the system as a classifying tree information. It is possible to view a general view of the image DB by browsing an entire image of the saved classifying tree by using the keywords and synthesized images.

(4) Also, there is a prior art for "a face image model retrieval processing method" which is disclosed in Japanese Unexamined Patent Application, First Publication No. Hei 8-221547.

An object of the invention which is disclosed in Japanese Unexamined Patent Application, First Publication No. Hei 8-221547 is to provide a simple face image model retrieval processing method in which it is possible to extract characteristics of the face area very accurately and effectively in a high speed from the object as a written datum. Consequently, a face area mosaic characteristics extracting section forms a variable density image which includes the face area in a mosaic manner; thus, the face area is extracted as a face area mosaic characteristics datum by making use of a fact that such a mosaic pattern is different between an inside and the outside of the face area. Next, a face image classification retrieving section retrieves a class in the categorized classification. By doing this, it is possible to extract and retrieve the face area very accurately in high speed not by using an edge section in the object for extracting the face area but by using a density pattern in the object area. Also, it is possible further to classify the categorized classification for the retrieval operation.

(5) Also, there is a prior art for "retrieving keyword determining method, its device, document retrieving device, and recording medium" which is disclosed in Japanese Unexamined Patent Application, First Publication No. Hei 10-307849.

An object of the invention which is disclosed in the Japanese Unexamined Patent Application, First Publication No. Hei 10-307849 is to specify only necessary keywords in a document retrieving device in which it is possible to perform a thesaurus retrieving operation by using a plurality of keywords which relate each other. In addition, in a keyword determining device, nominated keywords which are supposed to be added to the inputted keywords are retrieved from a thesaurus dictionary. Simultaneously, a document for explaining the nominated keywords is retrieved from an explanatory document file. Consequently, a score which corresponds to a relating degree to the inputted keywords and the nominated keywords is added to the explanatory documents; thus, the score is displayed n a display device so as to expedite the user to determine whether or not for adding the nominated keywords. If the user's decision is analyzed, and if it is determined that the keywords are not necessary to be added, only the inputted keywords are used for the retrieving operation.

If it is necessary to add the nominated keywords, such nominated keywords are added for the retrieving operation.

However, the above conventional methods have following problems.

In the method which is explained in the above paragraph (1) for adding the external information to the image, it is necessary to add the external image to all images preferably. However, it is a very disturbing operation to add the external information (keywords) to the image so as to realize a retrieving operation in variable forms; thus, such an operation is not realistic.

In the method which is explained in the above paragraph (2) for using a quantitative characteristics of the image itself, a plurality of images which have equal quantitative characteristics are displayed on the display device according to a certain law so as to extract a desirable image therefrom. Therefore, the object of the invention which is explained in the above paragraph (2) is different from the object (for example, a human) of the present invention for performing an efficient retrieving operation for the objects in the image.

The object in the method in the above paragraph (3) which is disclosed in Japanese Unexamined Patent Application, First Publication No. 2001-160057 is to perform classify and retrieve the image interactively in a hierarchically by using the image dictionary which is produced in advance. The object of the present invention is to add the keywords efficiently by detecting the object (for example, a human) in the image; therefore, the object and the structure in the present invention is different from the object and the structure in the invention which is disclosed in Japanese Unexamined Patent Application, First Publication No. 2001-160057.

The object in the method in the above paragraph (4) which is disclosed in Japanese Unexamined Patent Application, First Publication No. 8-221547 is to categorize the categorized classification by forming a variable density image of the face image. An object for the present invention is to add keywords efficiently by detecting the object (such as a human) in the image; thus the object ant the structure in the invention which is disclosed in Japanese Unexamined Patent Application, First Publication No. 8-221547 are different from those in the present invention.

The object in the method in the above paragraph (5) which is disclosed in Japanese Unexamined Patent Application, First Publication No. Hei 10-307849 is to select the nominated keywords which are supposed to be added to the inputted keywords from the thesaurus dictionary. The object of the present invention is to add the keywords efficiently by detecting the object (such as a human) in the image; thus, thus the object ant the structure in the invention which is disclosed in Japanese Unexamined Patent Application, First Publication No. Hei 10-307949 are different from those in the present invention.

SUMMARY OF THE INVENTION

The present invention was made in consideration of these problems. An object of the present invention is to provide an image retrieving device, a method for adding keywords in the image retrieving device, and a computer program therefore so as to detect an object (such as a human) in the image when the image is classified and add keywords to the image efficiently by preparing templates for the retrieving operation in advance and retrieve the image mainly with reference to the objects.

An image retrieving device in the present invention for classifying and retrieving an image by detecting an object in the image and adding a keyword comprises an image storing section for storing the image which is supposed to be classified and retrieved together with the keyword in a database, an object acknowledging section for acknowledging a predetermined object in the image which is inputted, a keyword proposing section for proposing the keyword which relates to the object which is acknowledged by the object acknowledging section, and an object information inputting section for confirming, adding, and correcting the keyword which is proposed by the keyword proposing section.

The images which are supposed to be classified and detected are saved in the database together with the keywords by the image storing section in such a structure. Consequently, a new predetermined object which is inputted in the image (such as a human or a car) is acknowledged (detected) by the object acknowledging section. If a predetermined object is detected by the object acknowledging section, the keywords which relate to the object are proposed to the user by the keyword proposing section. Also, in this aspect of the present invention, an object information inputting section is disposed for confirming, adding, and correcting the proposed keywords by the user.

By doing this, it is possible to add the keywords to the image efficiently by detecting the inputted objects in the image in the detecting/classifying device for the image. Also, the keywords which relate to the object in the image is added; thus, it is possible to retrieve the image which contains a specific object among numerous images accurately and efficiently.

Also, in the image retrieving device in the present invention, the object acknowledging section comprises a human detection condition inputting section for setting up conditions for determining whether or not the image contains a human, a face image detecting section for detecting a face image in the image, and a face image similarity determining section for detecting a face image which is detected by the face image detecting section so as to detect a similar face image stored in the database according to the detected face imaged.

In such a structure, an object which is supposed to be acknowledged (detected) should be a human. Consequently, a condition (for example, for detecting a skin color area) for determining whether or not a human is contained in the image is set up by a human detection condition inputting section. Consequently, a face image is detected in the newly inputted image by the face image detecting section. Also, when the face image is detected by the face image detecting section, a similar face image is detected with reference to the database by the image similarity determining section according to the detected face image. Consequently, if the similar face image is detected, the keyword which relates to the face image is proposed to the user so that the user may confirm, add, or correct the keyword.

By doing this, it is possible to add the keywords to the image efficiently by detecting the human in the inputted image in the retrieving/classifying device for the image. Also, the keywords which relate to the human in the image; thus, it is possible to retrieve the image which contains a specific person accurately and efficiently among numerous images.

In the image retrieving device of the present invention, the object information inputting section serves as a personal information inputting section for confirming, adding, and correcting a personal information.

In such a structure, an object which is supposed to be acknowledged (detected) is a human such that the keyword (human information) is confirmed for the detected human and the keyword is inputted for the human if a human is detected in the image.

By doing this, the human in the inputted image is detected and the keywords (human information) which relate to the human in the image is added; thus, it is possible to add the keywords accurately.

Also, in the image retrieving device of the present invention, a skin color area detecting section for detecting a skin color area in the image is used when the human is detected.

By doing this, the human is detected by the skin color detecting section in addition to a function for detecting the human by using the face image detecting section.

By doing this, it is possible to detect the human in the image more reliably and effectively.

Also, the image retrieving device of the present invention further comprising a keyword proposing section for proposing the keyword to the image which is inputted last in a case in which the similar face image is not detected by the face image similarity determining section.

In such a structure, if a similar face image is not detected by the face image similarity determining section, there is a high possibility in that an image for the same human according to the same kind (same theme) may be inputted; therefore, the keywords which are added to the image which is inputted last are proposed.

By doing this, it is possible to increase the possibility for adding the keywords in a case in which the similar image is not detected.

Also, in the image retrieving device of the present invention, the keyword is added according to a retrieving template which is formed by the keywords which have hierarchical structure.

By such a structure, a retrieving template is prepared in advance which is formed by the keywords having a hierarchical structure; thus, the keywords which are contained in the retrieving template are proposed to the user. Thus, it is expedited for the keywords to be added.

By doing this, it is possible to add the keywords by a simple operation by using the template. Also, the retrieving template is formed according to the category such that the keywords are disposed hierarchically. Therefore, it is possible to classify and retrieve the images efficiently. Also, for example, it is possible to use the retrieving template which is prepared in advance so as to have a correctable described human relationship; therefore, it is possible to retrieve the image easily according to the human information.

Also, a method in the present invention for adding keywords in an image retrieving device for classifying and retrieving an image by detecting an object in the image and adding a keyword comprises the steps for storing the image which is supposed to be classified and retrieved together with the keyword in a database, acknowledging a predetermined object in the image which is inputted, proposing the keyword which relates to the object which is acknowledged by the object acknowledging section, and confirming, adding, and correcting the keyword which is proposed by the keyword proposing section.

By such steps, the images which are supposed to be classified and retrieved are saved in the database together with the keywords in the image storing step. Consequently, a specific object (such as a human or a car) in the newly inputted image is acknowledged (detected) in the object acknowledging step. In addition, if a specific object is detected in the object acknowledging step, the keywords which relate to the object are proposed to the user in the keyword proposing step. Also, the user confirms, adds, or corrects the proposed keywords in the object information inputting step.

By doing this, the object in the inputted image is detected in the retrieving/classifying device for the image; thus, it is possible to add the keywords to the image efficiently. Also, the keywords which relate to the object in the image are added; therefore, it is possible to retrieve the images which contain specific objects among numerous images accurately and efficiently.

Also, a computer program in the present invention for a computer in an image retrieving device for classifying and retrieving an image by detecting an object in the image and adding a keyword comprises commands for storing the image which is supposed to be classified and retrieved together with the keyword in a database, acknowledging a predetermined object in the image which is inputted, proposing the keyword which relates to the object which is acknowledged by the object acknowledging section, and confirming, adding, and correcting the keyword which is proposed by the keyword proposing section.

BRIEF DESCRIPTION OF THE DRAWINGS

FIG. 6 is a view for showing an example for a record which is recorded in a database.

FIG 10 is a block diagram for explaining an example for a structure of an image retrieving device.

DETAILED DESCRIPTION OF THE INVENTION

Next, embodiments of the present invention are explained with reference to drawings as follows.

[Basic Concept for an Image Retrieving Device According to the Present Invention]

In the image retrieving device of the present invention, the object (such as a human) in the image is detected. A template for the keywords are prepared in advance; thus, the keywords are added to the image easily in which the keyword is detected. By doing this, it is possible to retrieve the object by using the keywords effectively.

In addition, the keywords are provided with following characteristics.

(1) When an object (such as a human) in the image is detected, a keyword for specifying the object is added to the image. In such a case, a keyword which is prepared in advance is proposed such that a system inquires the user which category the image belongs to. If there is an item coincides the keyword in the proposed category, the user selects such a keyword.

(2) The keyword is used for retrieving an image which contains a human. Such keywords can be set up in a hierarchical structure. For example, if an object is a human, a "family" and "relative" may be keywords for superior concept.

Furthermore, it is possible to name "eldest brother", "eldest sister", and "maternal relative" for a subordinate concept.

(3) Basic keywords which are formed in a hierarchical structure are prepared for the retrieving template so as to be correctable (such as an additional keywords).

In the image retrieving device of the present invention, it is possible to add the keywords to the image simply in the above manner.

[Specific Structure of the Image Retrieving Device of the Present Invention]

Figure 1:
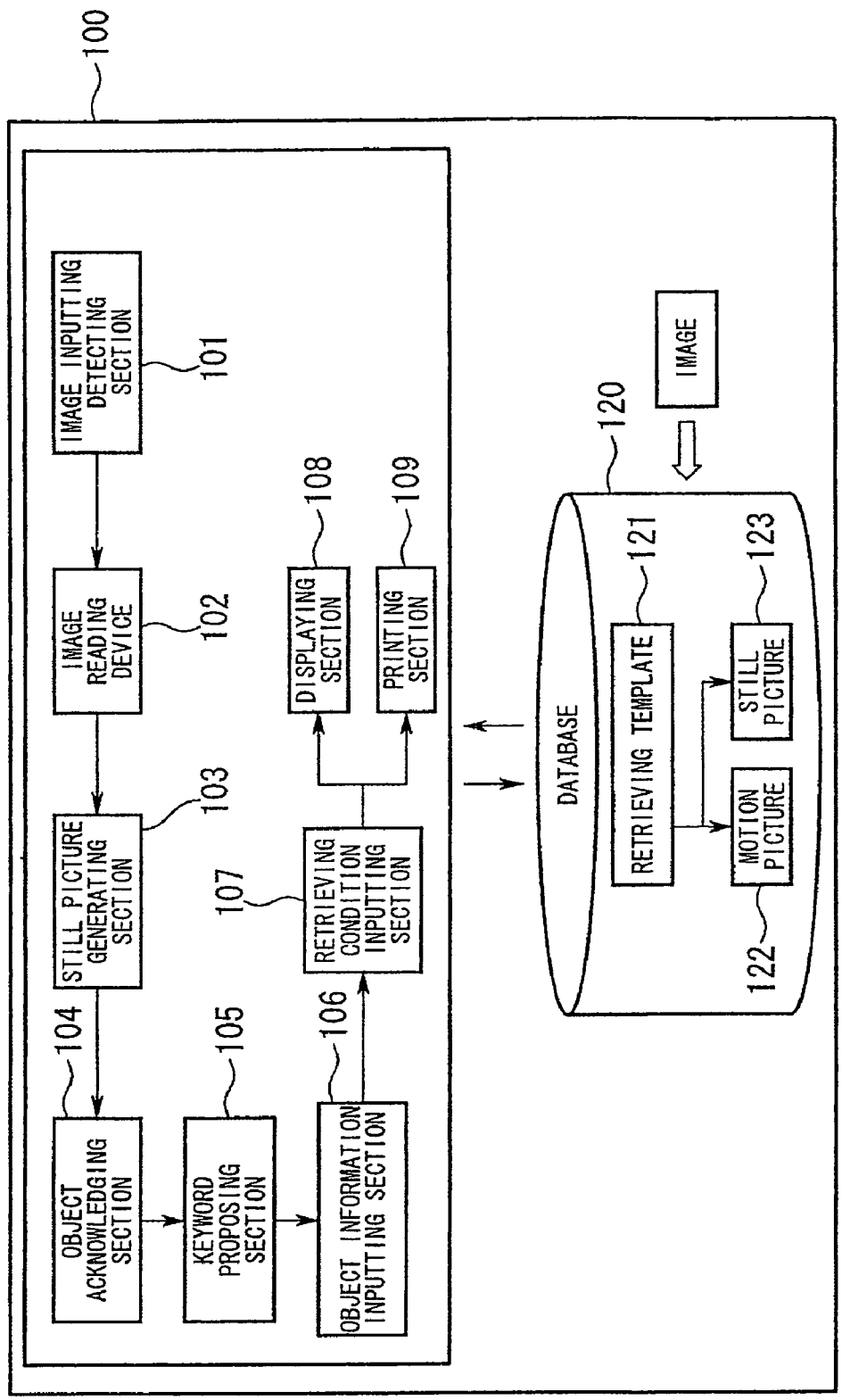
FIG. 1 is a block diagram for explaining a structure of a device which is provided in an image retrieving device of the present invention.

FIG. 1 is a block diagram for a structure in a device which is provided in the image retrieving device of the present invention. In the FIG. 1, only sections which relate to the present invention are shown. Sections which are provided in the image retrieving device shown in FIG. 1 have following functions.

(1) Image Inputting Detecting Section 101

The image inputting detecting section 100 detects a fact that a new image is contained in the image detecting section 100.

(2) Image Reading Device 102

The image reading device 102 reads values (such as RGB values) for pixels which form the image.

(3) Still Picture Generating Section 103

The still picture generating section 103 generates a still picture from a motion picture if the image is a motion picture.

(4) Object Acknowledging Section 104

The object acknowledging section 104 acknowledges whether of not a specific object is contained in an image by analyzing the image. For a specific example, a case in which an object is a "human" is explained later.

(5) Keyword Proposing Section 105

The keyword proposing section 105 extracts a keyword which relates to an object by referring to a database when the object is detected so as to propose the keywords to the user. For a specific example, a case in which an object is a "human" is explained later.

(6) Object Information Inputting Section 106

The object information inputting section 106 serves for a user to select an object information among the proposed keywords or to input/update the keywords. For a specific example, a case in which an object is a "human" is explained later.

(7) Retrieving Condition Inputting Section 107

The retrieving condition inputting section 107 serves for inputting a retrieving condition for the image which is supposed to be retrieved. For example, if an object which is supposed to be retrieved is a human, retrieving conditions (keywords) such as selecting among "family", and "friend" are inputted.

(8) Displaying Section 108

The displaying section 108 displays a retrieved result.

(9) Printing Section 109

The printing section 109 prints the retrieved result.

Here, a retrieving template 121 for adding the keywords and data for a motion picture 122 and a still picture 123 which are related to the keywords (retrieving template) are stored in a database (image storing section 120.

Next, more detail of the image retrieving device of the present invention is explained with reference to an example in which an object which is supposed to be detected is a "human".

Figure 2:
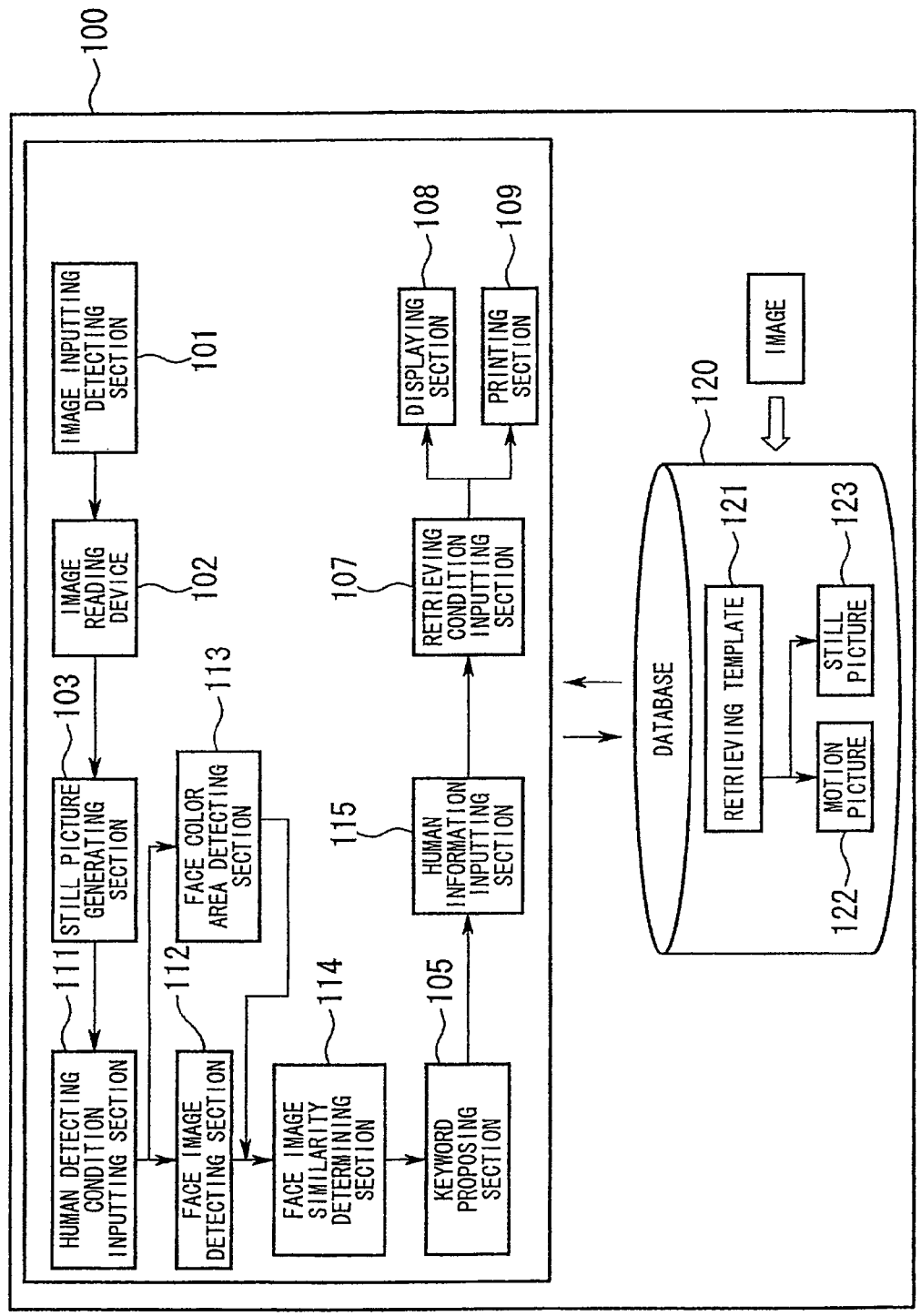
FIG. 2 is a block diagram for explaining a structure of a device in case an object is a human.

FIG. 2 is a block diagram for explaining an example of a structure in an image retrieving device shown in FIG. 1 for a case in which an object which is supposed to be detected is a "human". The object acknowledging section 104 shown in FIG. 1 realizes functions for a human detecting condition inputting section 111, a face image detecting section 112, a face color area detecting section 113, and a face image similarity determining section 114 which are shown in FIG. 2. Also, the object information inputting section 106 shown in FIG. 1 serves for a human information inputting section 115 shown in FIG. 2. The rest of the sections are the same as each other between FIGS. 1 and 2.

Hereinafter, sections shown in FIG. 2 are explained. Hereinafter, the same reference numerals are applied to corresponding members as shown in FIG. 2 so as to omit the repeated explanation thereof.

(1) Human Detecting Condition Inputting Section 111

The human detecting condition inputting section 111 sets up a condition for determining whether or not a human is contained in an image. The human detecting condition inputting section 111 not only detects the face image but also inputs conditions for detecting the face color area and determining whether or not a human is contained in the image.

(2) Face Image Detecting Section 112

The face image detecting section 112 detects the fact for whether or not a face image is contained in the image by analyzing the image. There are various methods for detecting the face image such that patterns for the face images are stored in advance, or frequency analysis is performed for the image pattern. It may be acceptable if any one of these methods is performed. Also, it is possible to employ a method which is disclosed in Japanese Unexamined Patent Application, First Publication No. Hei 8-221547. Here, it may be acceptable if the face image detecting section 112 uses a face color area detecting section 113 which is explained in a next paragraph compatibly so as to perform a human detecting operation.

(3) Face Color Area Detecting Section 113

There are various methods for detecting a human by using not only a face image, but also an edge information and a template. Here, the face color is used. The face color area detecting section 113 determines whether or not the pixel which is read out is within a range of a skin color. For detecting such a skin color, it is possible to use a method which is disclosed in a document such as "Detecting a face not by depending on a background and a direction of a face, and inferring a direction of a face/Araki, Shimada, Shirai, TECHNICAL REPORT OF IEICE, INFORMATION AND COMMUNICATION ENGINEERS, PRMU2001-217 pp 87-94 (2002-01)".

In an item 2.1 in the above document, it is disclosed that a range of a skin color can be detected according to following formulae.

$$0.333 < r < 0.664, r > g$$

$$0.246 < g < 0.398, g \geq 0.5 - 0.5r$$

Here, there are relationships such as $r = R/(R+G+B)$, $g = G/(R+G+B)$. Here, R, G, and B indicate RGB values for the pixel.

(4) Face Image Similarity Determining Section 114

The face image similarity determining section 114 refers to the database 120 so as to check whether or not a similar face image to the detected face image is contained. Here, it is possible to employ a method which is disclosed in Japanese Unexamined Patent Application, First Publication No. Hei. 8-221547 for determining such a similarity by forming a density image of a face so as to classify the category.

(5) Human Information Inputting Section 115

The human information inputting section 115 serves for a user such that the user may select the human information according to the keyword information which is proposed by the image retrieving section 100 or input/update the keywords.

Figure 3:
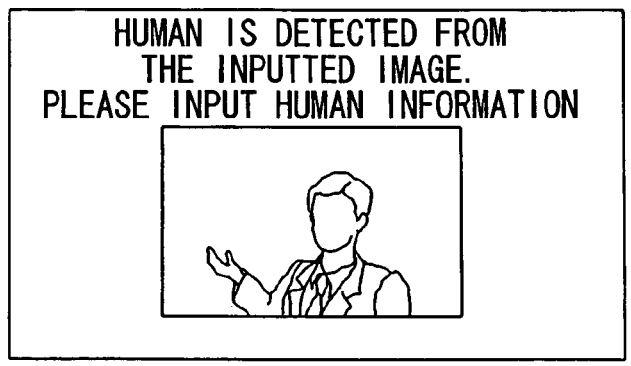
FIG. 3 is a view for explaining an example for a display for expediting an inputting operation for a human information.

FIG. 3 is a view for showing an example for a display for inputting the human information. Here, when a new image is contained in the image retrieving device 100, the image retrieving device 100 tries to detect a human in the contained image. If a human is detected, the image retrieving device 100 expedites a user to input the human information by a display form which is shown in FIG. 3.

In such a case, it is possible to use various methods for proposing the human information. For example, it is possible to propose keyword information to the user by a following priority so as to increase an operability for the users.

If it is determined that the face image coincides to the face image which is contained previously or that the face image is very similar to the face image which is contained previously, the information for such a human is proposed so as to expedite the user to confirm.

The information for a human which is contained in an image which is inputted last, an updated human information, or a keyword is displayed. This is because the images for the same human tend to be input continuously for a case in which family photographs are taken in cases for a school entrance ceremony or an athletic meet.

Figure 4:
FIG. 4 is a view for showing a first example for a method for proposing a human information which is supposed to be a keyword.

FIG. 4 is a view for a first example for a method for proposing human information which is supposed to be a keyword. As shown in FIG. 4, keywords such as "an eldest brother", "a family", "a relative", or "a friend" are registered for the human information in advance. That is, FIG. 4 is an example in which these keywords are proposed according to the above priority. If there is an item which coincides the priority, the user selects such an item. If there is not an item which coincides the priority, the user can select an option for "making a new human information" or "making a new human category"; thus, the user can add new item.

Figure 5:
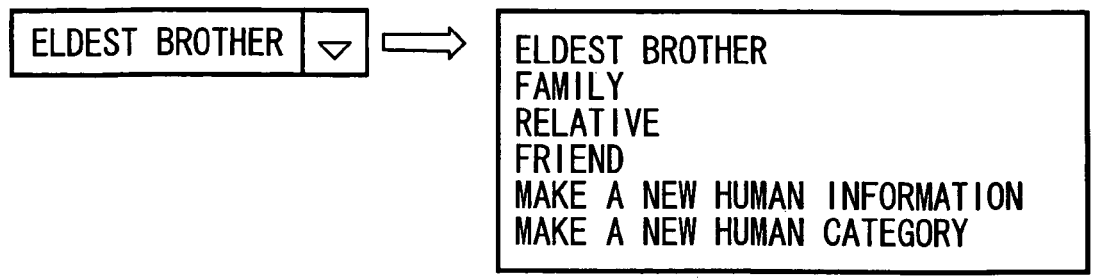
FIG. 5 is a view for showing a second example for a method for proposing a human information which is supposed to be a keyword.

FIG. 5 is a view for an example for a second method for proposing the human information which is supposed to be the keyword. FIG. 5 is an example in which a keyword which has the superior priority (eldest brother) is disposed. If the image does not relate to the eldest brother, a coincident keyword via a pull-down menu.

FIG. 6 is a view for an example for a record which is stored in the database 120. The keywords are recorded in the database 120 in two-layer hierarchical structure which has a superior keyword 1 and a subordinate keyword 2. For example, the superior keyword 1 indicates a "family". The subordinate keyword 2 is a "second eldest brother" such that a first name is "jiro" who was born on "Jan. 1, 2003". Here, three images 1, 2, and 3 are saved.

Figure 7:
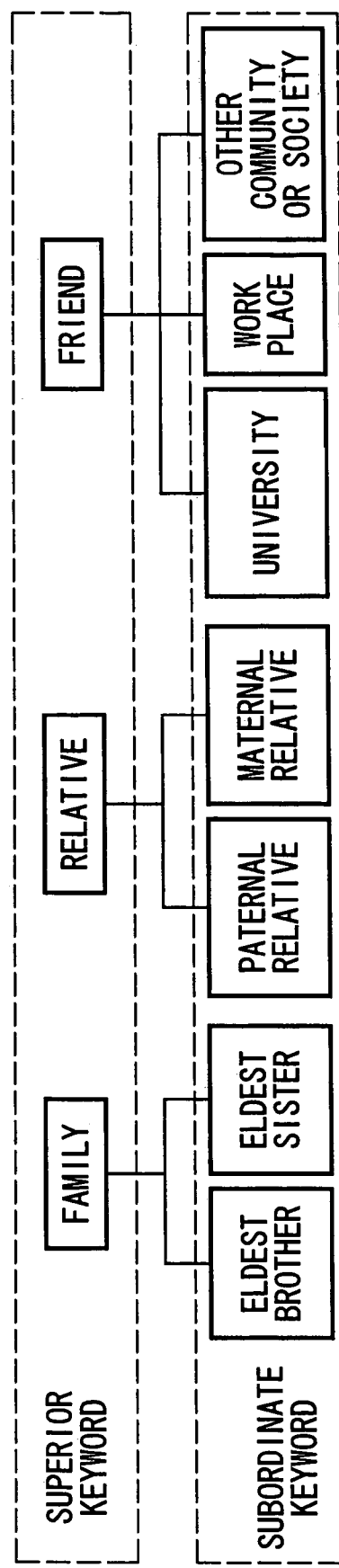
FIG. 7 is a view for explaining an example for a retrieving template which describes a human relationship.

FIG. 7 is a view for showing an example for the retrieving template which is used for showing the human relationship. The retrieving template is prepared in the database 120 in advance. Consequently, if a record which is shown in FIG. 6 is added such that images which relate to the "second eldest brother" are contained, it is necessary to produce a keyword for the "second eldest brother" as a subordinate keyword under the superior keyword "family". Such operations are performed by the operations which are shown in FIGS. 3, 4, and 5.

Next, the processing steps in the image retrieving device of the present invention are explained with reference to the flow chart.

Figure 8:
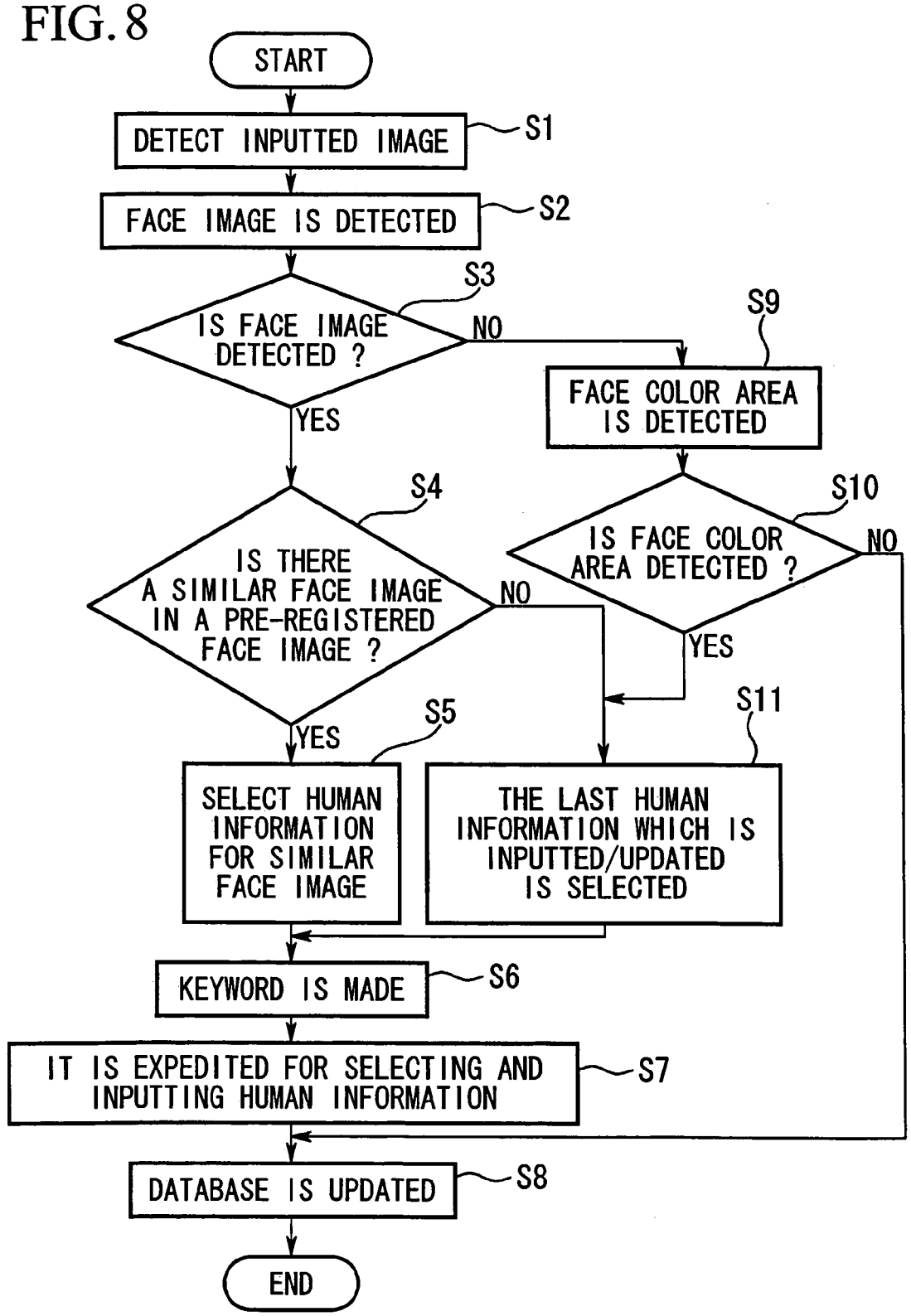
FIG. 8 is a flow chart for explaining processing steps for detecting a human and adding the keywords.

FIG. 8 shows the processing steps for detecting a human and adding the keywords in the image retrieving device of the present invention. In this flow chart, the processing steps for detecting the human in the image and registering the keywords are shown. Hereinafter, the processing steps are explained with reference to FIG. 8.

(1) Step S1: A newly inputted image is detected by the image inputting detecting section 101.

(2) Step S2: It is tried out whether or not a face image can be detected from the image which is inputted by the face image detecting section 112. The image data is read by the image reading section 102. Also, when a motion picture is inputted, a still picture is produced by the still picture generating section 103 according to a predetermined rule such that the still pictures should be generated every certain period of time interval so as to proceed the steps thereafter.

(3) Step S3: It is checked whether or not the face image is detected.

(4) Step S4: It is checked whether or not a face image which is similar to a face image which is pre-registered by the face image similarity determining section 114 exists in the database 120.

(5) Step S5: A human information which corresponds to the similar face image is selected from the database 120.

(6) Step S6: If there is not a pre-registered keyword, a new keyword which indicates a human is produced.

(7) Step S7: The selected human information is displayed by the displaying section 108 so as to expedite the user to select the human information (selection of the keyword) and input the necessary information.

(8) Step S8: The database 120 which contains the human information is updated.

(9) Step S9: If the face image is not detected in the step S3, the processing step goes to the step S9 in which a skin color area is detected from the inputted image by the skin color area detecting section 113.

(10) Step S10: It is checked whether or not the skin color exits.

(11) Step S11: If the skin color area is not detected in the Step S10, the human information which is inputted/updated last.

Figure 9:
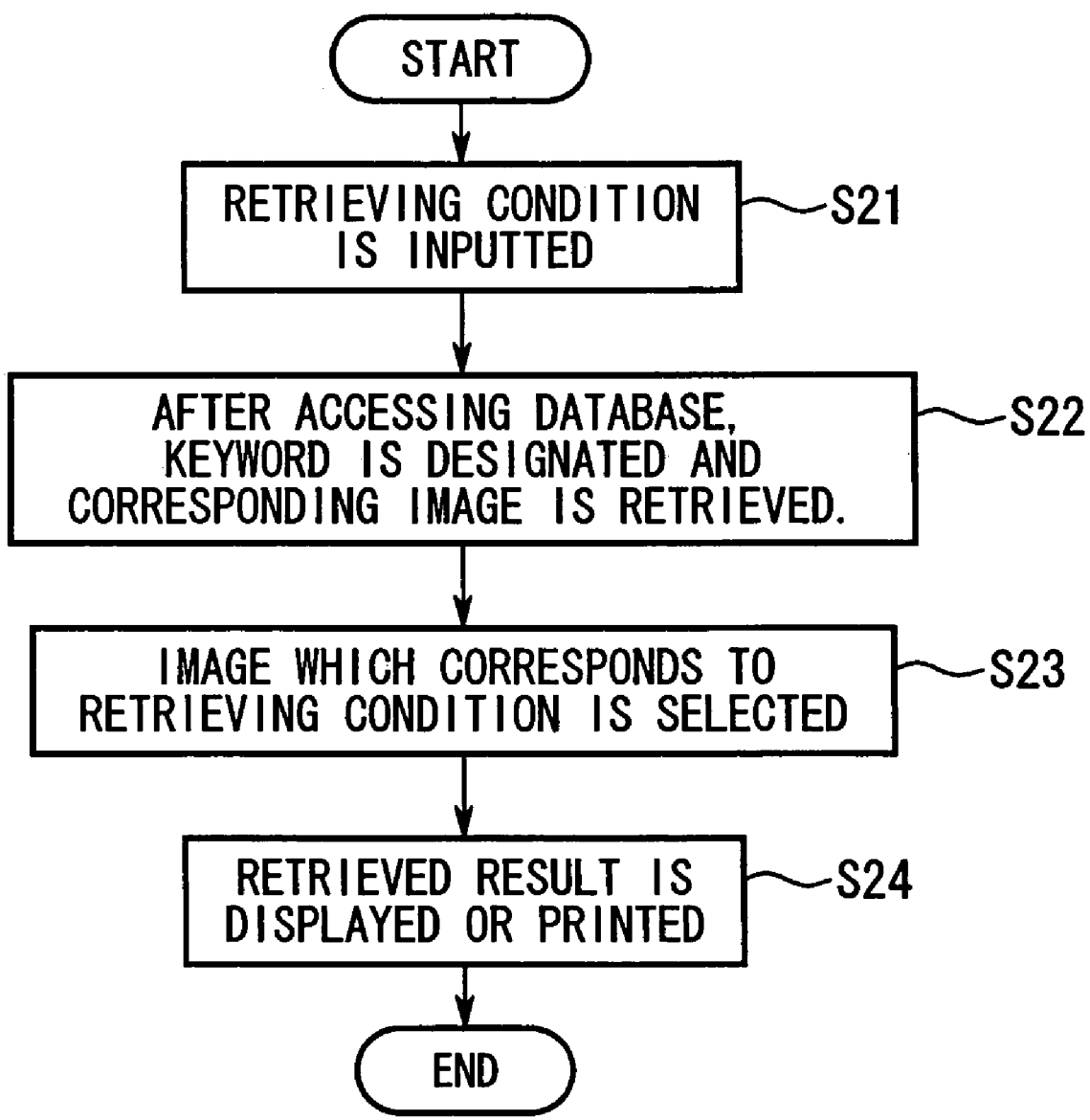
FIG. 9 is a flow chart for explaining processing steps for a case in which a detecting operation is operated.

Also, FIG. 9 is a flow chart for explaining processing steps for a retrieving operation.

(1) Step S21: Retrieving condition is inputted by a retrieving condition inputting section 107.

For example, following retrieving conditions are inputted.

All the Photographs which relate to Jiro contained in the database 120.

Photographs for all friends who belong to a certain community or a certain society which are taken in year 2003.

(2) Step S22: Keywords are set up according to the designated retrieving condition so as to access the database 120.

(3) Step S23: All the images which correspond the retrieving condition are selected.

(4) Step S24: The selected images are displayed by the displaying section 108, or printed by the printing section 109.

According to the above processing steps, it is possible to register the keywords to the images and retrieve the images.

Also, FIG. 10 is a block diagram for explaining an example for a structure of the image retrieving device in which the object which is supposed to be retrieved is a human such that only sections which relate to the present invention are shown. In FIG. 10, reference numeral 100 indicates an image retrieving device. Reference numeral 1 indicates a communication network such as Internet. Reference numeral 131 indicates a communication interface which connects the image retrieving device and the communication network 1. Reference numeral 132 indicates a controlling section which controls an entire image retrieving device integrally. Reference numeral 140 indicates a processing program section. Here, it is acceptable if a PC (personal computer) is used for the image retrieving device 100.

Also, following processing sections are contained in the processing program section 140.

Image Inputting Detecting Processing Section 141

The image inputting detecting processing section 141 detects a fact that a new image is contained in the image retrieving device 100.

Image Reading Processing Section 142

The image reading processing section 142 reads out various values (such as the RGB values) for each pixel which forms the image.

Still Image Generating Processing Section 143

The still image generating processing section 143 generates a still picture from the motion picture if the image is a motion picture.

Human Detecting Condition Inputting Processing Section 144

The human detecting condition inputting processing section 144 sets up a condition for determining whether or not a human in contained in the image. Here, conditions for determining is inputted whether or not a human is contained in the image not only by detecting the face image but also by detecting the skin color in the image.

Face Image Detecting Processing Section 145

The face image detecting processing section 145 detects a fact for whether or not the face image is contained in the image by analyzing the image. There are various methods for detecting the face image such that patterns for the face images are stored in advance, or frequency analysis is performed for the image pattern. It may be acceptable if any one of these methods is performed. Also, it is possible to employ a method which is disclosed in Japanese Unexamined Patent Application, First Publication No. Hei 8-221547. Here, it may be acceptable if the face image detecting processing section 145 may detect a human by using a skin color area detecting processing section 146 compatibly which is explained in following paragraphs.

Skin Color Area Detecting Processing Section 146

The skin color area detecting processing section 146 determines whether or not the values in the read-out pixel is within a range for the skin color. For detecting such a skin color, it is possible to use a method which is disclosed in a document such as "Detecting a face not by depending on a background and a direction of a face, and inferring a direction of a face/ Araki, Shimada, Shirai, TECHNICAL REPORT OF IEICE, INFORMATION AND COMMUNICATION ENGINEERS, PRMU2001-217 pp 87-94 (2002-01)".

Face Image Similarity Determining Processing Section 147

The face image similarity determining processing section 147 performs a checking operation for whether or not a face image which is similar to the detected face image is contained with reference to the database 120. For such a determining operation for the similarity, it is possible to employ a method which is disclosed in Japanese Unexamined Patent Application, First Publication No. Hei 8-221547 in which a mosaic pattern of the face image is formed so as to classify the category.

Keyword Proposing Processing Section 148

The keyword proposing processing section 148 extracts the keyword which relates to the detected object with reference to the database 120 so as to propose the keywords to the user.

Human Information Inputting Processing Section 149

The human information inputting processing section 149 serves for the use such that the user may select the human information according to the keyword information which are proposed by the image detecting device 100 or the user may input/update the keyword (see FIGS. 3 and 4).

Retrieving Condition Inputting Processing Section 150

The retrieving condition inputting processing section 150 serves for inputting the retrieving condition for the image which is supposed to be retrieved. Here, for example, the retrieving conditions for selecting "family" or "friend" are inputted.

Displaying Processing Section 151

The displaying processing section 151 displays the retrieved result.

Printing Processing Section 152

Also, the retrieving template 121 which adds the keyword to the image and data which relate to the motion picture 122 and the still picture 123 which are related to the keyword (retrieving template) are stored in the database (image storing section) 120 (see FIG. 6).

Here, it is acceptable if the processing program section 140 may be realized by a hardware which is used for the processing program section 140 exclusively. Also, it is acceptable the processing program section 140 may be formed by a common information processing device such as a memory and a CPU (central processing unit) in which the program (not shown in the drawing) for realizing the functions in the processing section is loaded to the memory and executed. Also, it should be understood that peripheral apparatuses such as an inputting device, a displaying device, and a printing device (neither of which are shown in the drawings) are connected to the image retrieving device 100. Here, a keyboard, a computer mouse can be named for such an inputting device. Also, a CRT (cathode-ray tube) and a liquid displaying device can be named for the displaying device. Also, a laser printer and an inkjet printer can be named for the printing device.

Also, it is acceptable if operations which are necessary for the image retrieving device of the present invention by recording the program for realizing the function in the image retrieving device 100 shown in FIG. 10 in a computer-readable recording medium and loading the program which is recorded in the recording medium into the computer system so as to execute the program. Here, it should be understood that the "computer system" may include an OS (operation system) and a hardware such as a peripheral apparatus.

Also, it should be understood that the "computer system" may contain an environment in which a homepage is provided (or an environment in which a homepage is displayed) under condition that the computer system is a www (world-wide-web) system. Also, a portable medium such as a flexible disc, a optical magnetic disc, a ROM (read-only-memory), a CD-ROM (computer-disc read-only-memory) and a storing device such as a hard disc which is built in a computer system can be named for the "computer-readable recording medium".

Furthermore, it should be understood that, for the "computer-readable recording medium", a communication line (transmitting medium or a transmitting wave) for transmitting the program via a communication circuitry such as a network like Internet or a telephone line can be named for maintaining a program dynamically for a short period of time. Also, it should be understood that, for the "computer-readable recording medium", a volatile memory which is disposed in a computer system as a server and a client under the above condition may be named for maintaining the program for a certain period of time. Also, the above program may serve for realizing a part of the above functions. Also, the above program may be a differential file (differential program) which can realize the above functions with a combined use of the program which is recorded in the computer system in advance.

Here, in the image retrieving device of the present invention which is explained above, explanations are made for an example in which a keyword is added under condition that the object which is supposed to be classified in the image is a face image (human). However, more importantly, the present invention is not limited to such an example; that is, it is possible to add keywords by detecting the object such as a car and an animal which are supposed to be classified.

The embodiments of the present invention are explained as above. More importantly, the image retrieving device according to the present invention disclosed herein is susceptible to various modifications and alternative forms. It should be understood, however, that the drawings and detailed description thereto are not intended to limit the invention to the particular form disclosed, but on the contrary, the invention is to cover all modifications, equivalents and alternatives falling within the scope of the present invention as defined by the claims.

What is claimed is:

1. An image retrieving device for classifying and retrieving an image by detecting an object in the image and adding a keyword, the image retrieving device comprising:
    an image storing section for storing the image which is supposed to be classified and retrieved together with a keyword in a database and an object of the image being previously contained in the database;
    an image inputting detecting section that detects an inputted image that is newly inputted to the image retrieving device;
    an object acknowledging section for acknowledging an inputted object in the inputted image that has been detected by the image inputting detecting section;
    a keyword proposing section for proposing the keyword on a display, the keyword which relates to the inputted object which is acknowledged by the object acknowledging section; and
    an object information inputting section for confirming by the user, adding, and correcting the keyword which is proposed by the keyword proposing section when the inputted object acknowledged by the object acknowledging section is similar to the object of the image previously contained in the database.

2. An image retrieving device according to claim 1, wherein the object acknowledging section includes:
    a human detection condition inputting section for setting up conditions for determining whether or not the image contains a human;
    a face image detecting section for detecting a face image in the image; and
    a face image similarity determining section for detecting a face image which is detected by the face image detecting section so as to detect a similar face image stored in the database according to the detected face imaged.

3. An image retrieving device according to claim 2 wherein the object information inputting section serves as a personal information inputting section for confirming, adding, and correcting a personal information.

4. An image retrieving device according to claim 2 further comprising a skin color area detecting section for detecting a skin color area in the image, wherein
    the skin color area detecting section is used when the human is detected.

5. An image retrieving device according to claim 2 further comprising a keyword proposing section for proposing the keyword to the image which is inputted last in a case in which the similar face image is not detected by the face image similarity determining section.

6. An image retrieving device according to claim 1 wherein the keyword is added according to a retrieving template which is formed by the keywords which have hierarchical structure.

7. A method for adding keywords in an image retrieving device for classifying and retrieving an image by detecting an object in the image and adding a keyword, the method comprising:
    storing the image which is supposed to be classified and retrieved together with the keyword in a database and an object of the image being previously contained sin the database;
    detecting an inputted image that is newly inputted to the image retrieving device by an image inputting detection section;
    acknowledging an inputted object in the inputted image that has been detected by the image inputting detecting section;
    proposing a keyword on a display, the keyword which relates to the inputted object which is acknowledged by an object acknowledging section; and
    confirming by the user, adding, and correcting the keyword which is proposed by the keyword proposing section when the inputted object acknowledged by the object acknowledging section is similar to the object of the image previously contained in the database.

8. A computer readable medium storing a computer program for operating an image retrieving device which classifies and retrieves an image by detecting an object in the image and adding a keyword, the storage medium comprising:
    storing the image which is supposed to be classified and retrieved together with a keyword in a database and an object of the image being previously contained in the database;
    detecting an inputted image that is newly inputted to the image retrieving device by an image inputting detecting section;
    acknowledging an inputted object in the image that has been detected by the image inputting detecting section;
    proposing the keyword on a display, the keyword which relates to the inputted object which is acknowledged by an object acknowledging section; and
    confirming by the user, adding, and correcting the keyword which is proposed by the keyword proposing section when the inputted object acknowledged by the object acknowledging section is similar to the object in the image previously contained in the database.

9. An image retrieving device according to claim 2 wherein the keyword is added according to a retrieving template which is formed by the keywords which have hierarchical structure.

10. An image retrieving device according to claim 3 wherein the keyword is added according to a retrieving template which is formed by the keywords which have hierarchical structure.

11. An image retrieving device according to claim 4 wherein the keyword is added according to a retrieving template which is formed by the keywords which have hierarchical structure.

12. An image retrieving device according to claim 5 wherein the keyword is added according to a retrieving template which is formed by the keywords which have hierarchical structure.

13. A method according to claim 7, wherein the keyword is added according to a retrieving template which is formed by the keywords which have a hierarchical structure.

14. A computer readable medium storing a computer program according to claim 8, wherein the keyword is added according to a retrieving template which is formed by the keywords which have a hierarchical structure.

* * * * *